J. J. ROTH.
Devices for Cooling Millstones.
No. 143,258. Patented September 30, 1873.
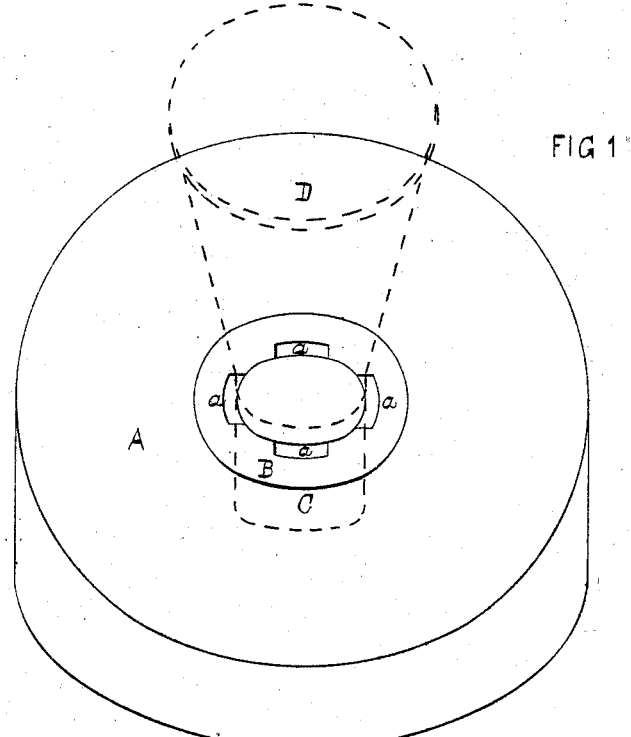
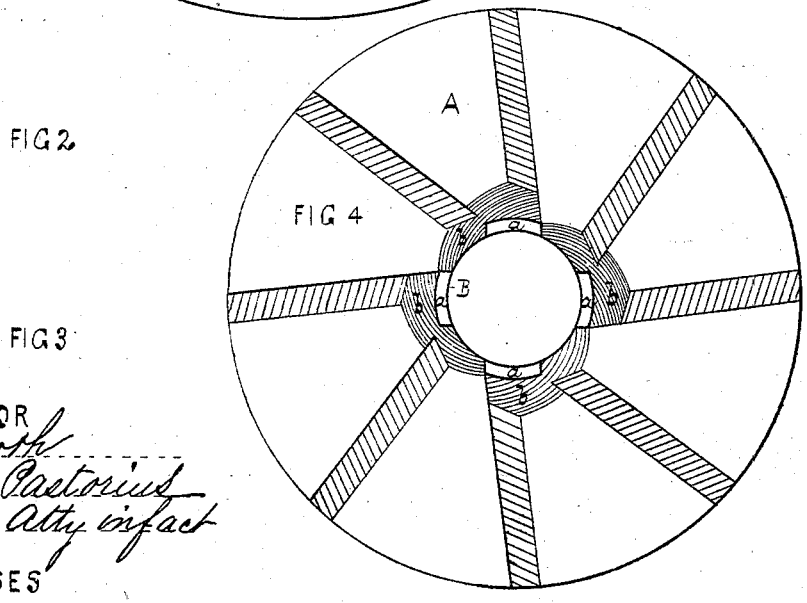

UNITED STATES PATENT OFFICE.

J. JACOB ROTH, OF PHILADELPHIA, PENNSYLVANIA.

IMPROVEMENT IN DEVICES FOR COOLING MILLSTONES.

Specification forming part of Letters Patent No. 143,258, dated September 30, 1873; application filed January 14, 1873.

*To all whom it may concern:*

Be it known that I, J. JACOB ROTH, of the city and county of Philadelphia and State of Pennsylvania, have invented an Improvement in Millstone-Cooling, of which the following is a specification:

The improvement consists of air-flues contained in vertical openings formed around the eye of the stationary stone of a paint-grinding mill. They are attached to a bushing, in which the spout of the hopper rises and lowers.

Figure 1 is a perspective view. Fig. 2 is a view of the flues and the eye-bushing. Fig. 3 is an elevation of Fig. 2. Fig. 4 is a bottom view of Fig. 1.

A is the upper or stationary stone of a mill, in the eye of which is fitted a metallic bushing, B, having air-flues *a a a* on its outer surface, which take into suitable recesses or openings formed around the eye of the stationary stone, for conveying air from the outside atmosphere between the stones to cool them, and to keep the material being ground from overheating and burning. The flues are of metal, and form part of the bushing, being in vertical openings formed in the stone.

The under side of the stone A, around the eye, can be chamfered, as shown at *b*, Fig. 4, to assist the circulation of the air, and to draw the paint from the spout C (dotted lines, Fig. 1) of the adjustable hopper D to the circumference of the stone.

I claim as my invention—

The stone A, bushing B, and the flues *a*, as and for the purpose shown and described.

In testimony whereof I hereunto sign my name.

J. JACOB ROTH.

Witnesses:
 FRANCIS D. PASTORIUS,
 E. P. COCHRAN.